H. H. WELCH.
CARBURETOR.
APPLICATION FILED MAR. 11, 1915.
1,405,700.
Patented Feb. 7, 1922.
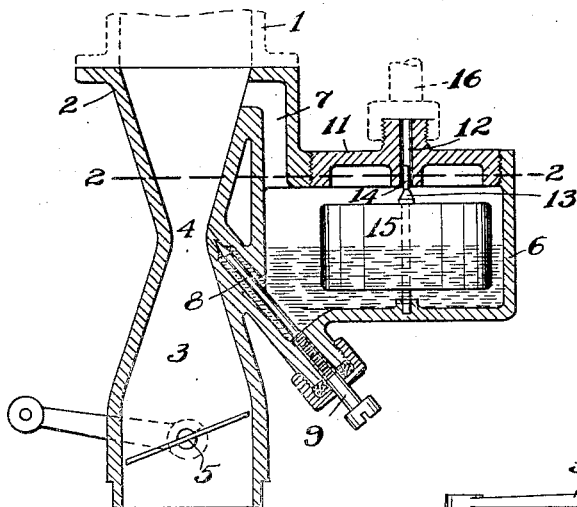
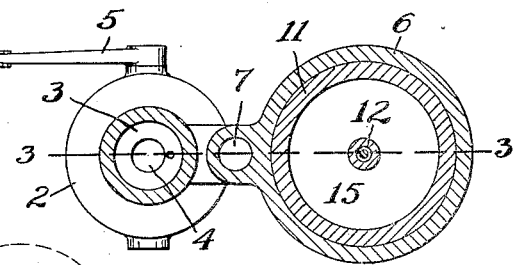
Fig. 2.
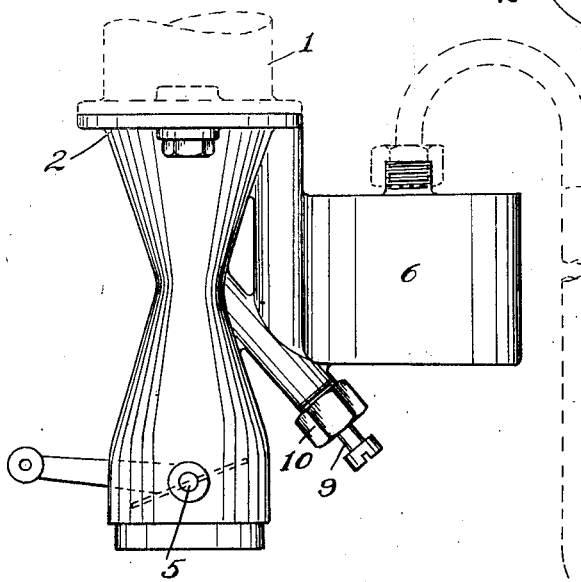
Fig. 3.
Fig. 1.
WITNESSES:
L. S. Woodhull.
INVENTOR
Horace H. Welch.
BY
B. J. Wheeler
ATTORNEY

UNITED STATES PATENT OFFICE.

HORACE H. WELCH, OF DETROIT, MICHIGAN, ASSIGNOR, BY MESNE ASSIGNMENTS, TO STROMBERG MOTOR DEVICES COMPANY, OF CHICAGO, ILLINOIS, A CORPORATION OF ILLINOIS.

CARBURETOR.

1,405,700.  Specification of Letters Patent.  Patented Feb. 7, 1922.

Application filed March 11, 1915. Serial No. 13,558.

*To all whom it may concern:*

Be it known that I, HORACE H. WELCH, a citizen of the United States, residing at Detroit, in the county of Wayne, State of Michigan, have invented certain new and useful Improvements in Carburetors; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to carburetors for internal combustion engines, and consists in the novel features of construction and arrangement of parts hereinafter more fully set forth and claimed.

The object of the invention is to provide a carburetion system wherein a predetermined level of the liquid fuel will be maintained in the float chamber, regardless of the level of the liquid in the supply tank with relation to said chamber, and without necessitating a surplus supply of the liquid fuel to said chamber, and furthermore without requiring a pump or other auxiliary circulating means to convey the liquid fuel from the supply tank to the float chamber.

The object more specifically stated is to provide a carburetion system wherein the reduced pressure created in the passage through which the engine draws its explosive mixture will be utilized to include a flow of liquid fuel to the float chamber from the supply tank, the flow being automatically regulated by a float controlled valve so as to maintain the desired normal level in said chamber.

The above object is attained by the employment of the structure illustrated in the accompanying drawings, wherein:

Fig. 1 is a view in side elevation of a carburetor constructed in accordance with my invention, showing it connected to an engine intake manifold indicated by dotted lines, and to a liquid fuel supply tank also indicated by dotted lines.

Fig. 2 is a central vertical sectional view through the carburetor and float chamber, taken on line 3—3 of Fig. 3.

Fig. 3 is a central horizontal sectional view on line 2—2 of Fig. 2.

Referring now more particularly to the drawings, wherein like reference characters designate similar parts in all the views, the numeral 1 designates the intake manifold of an engine which is fixedly connected with the outlet of a carburetor 2 having a main air and mixture passage 3 extending therethrough. Said passage 3 will preferably be restricted at a point intermediate the ends thereof, as is indicated at 4. The lower end of said passage is open to the atmosphere, and the flow of air therethrough is controlled by a common throttle valve 5 operatively mounted in the lower portion of the passage 3.

A reservoir or float chamber 6, which supplies liquid fuel to the passage 3 of the carburetor, is preferably formed integral therewith and has its upper portion in open communication with the upper end of said passage through a connecting passage 7 formed in the adjoining portions of said members. It is essential that the opening of the passage 7 to the float chamber should be above the normal liquid fuel level therein, as shown in Fig. 2. At a point below the normal liquid level and preferably adjacent the bottom of the float chamber, said chamber communicates with a liquid fuel feed passage 8, upwardly inclined and having a reduced outlet opening into the passage 3 at the restricted point 4 thereof.

The usual metering pin 9 is adapted to regulate the flow of liquid through the passage 8, and extending into said passage has threaded engagement with an ordinary stuffing-box boss 10 depending from the float chamber. The top of the float chamber is closed by a circular cap or plate 11 having screw-threaded engagement therewith, and may be removed to give access to said chamber. Said plate is provided with a centrally formed liquid fuel inlet 12, controlled by a valve 13 having a stem 14 movably seated therein and centrally carried by a float 15. This inlet 12 has communication through a supply pipe 16 with a liquid fuel supply tank 17 located at a lower level than that of the carburetor.

The structural features of the invention having been described, the operation will be understood to be as follows: When the engine, not shown, is running and the throttle is opened, it is apparent that air will be drawn into the passage 3, and that liquid fuel will be discharged into the restricted portion of said passage, it being understood that the metering pin is properly adjusted to admit the desired proportion of liquid fuel with the air to form a suitable explosive mixture, and as the level of the liquid fuel in the float chamber falls the valve 13 will be unseated. The comparatively low pressure set up in the passage 3 by the suction of the engine will induce through the passage 7 a consequent reduction and equalization of the pressure in the upper portion of the float chamber. As soon as the valve 13 is unseated, the liquid fuel will be caused to rise in the pipe 16 and discharge into the float chamber, since the atmospheric pressure acting on said liquid fuel in the tank 17 will be greater than the pressure exerted on the liquid fuel in said float chamber. This discharge of liquid fuel will continue until the liquid fuel in the float chamber regains its normal level and thereby seats the valve 13. Thus an alternate seating and unseating of said valve will take place whereby the level in the float chamber will remain substantially constant.

Although the throttle 5 may be located elsewhere in the passage to the manifold, its location in the lower portion thereof increases the depression which is transmitted to the float chamber.

The invention is presented as including all such modifications and changes as properly come within the scope of the following claim.

Having thus fully set forth my invention, what I claim as new, and desire to secure by Letters Patent, is:

In combination, a carburetor having an air passageway comprising a Venturi tube, one end thereof being for the entry of air and the other end thereof being for the exit of combustible mixture, a fuel nozzle feeding into said Venturi tube approximately at the most restricted part thereof, a float chamber feeding said fuel nozzle, a float in said chamber, a liquid fuel inlet for said chamber, a valve operated by said float and controlling said liquid fuel inlet for said chamber to determine the level of liquid fuel therein and in said fuel nozzle, a permanently unneutralized passage connecting said chamber above the liquid fuel level therein with said air passageway at the exit side of said most restricted part of said Venturi tube, a manually controlled throttle in said air passageway, the only obstructions in said passageway being fixed or manually controlled, and a liquid fuel supply tank below the level of liquid fuel in said chamber and connected directly with said liquid fuel inlet for said chamber.

In testimony whereof, I sign this specification in the presence of two witnesses.

HORACE H. WELCH.

Witnesses:
B. F. WHEELER,
M. E. BROESAMLE.